United States Patent

Patel

Patent Number: 5,845,458
Date of Patent: Dec. 8, 1998

[54] AUTOMOBILE ROOF HEADLINER

[75] Inventor: Rasik N. Patel, Canton, Mich.

[73] Assignee: Ford Global Technologies, Inc., Dearborn, Mich.

[21] Appl. No.: 851,394

[22] Filed: May 5, 1997

[51] Int. Cl.$^6$ ............................... E04C 2/00; E04C 2/54
[52] U.S. Cl. ............... 52/782.1; 52/787.12; 52/786.12; 296/137; 296/210; 296/211; 296/214; 428/99; 428/71; 428/77
[58] Field of Search ............... 52/782.1, 786.12, 52/787.12, 786.13, 787.11, 793.1, 796.1; 296/137, 210, 211, 214; 428/99, 71, 77, 76, 174

[56] References Cited

U.S. PATENT DOCUMENTS

| | | |
|---|---|---|
| 4,119,749 | 10/1978 | Roth et al. . |
| 4,131,702 | 12/1978 | Alfter et al. . |
| 4,600,621 | 7/1986 | Maurer et al. ................... 296/214 X |
| 5,082,716 | 1/1992 | Satterfield et al. ............. 296/214 X |
| 5,089,328 | 2/1992 | Doerer et al. . |
| 5,120,593 | 6/1992 | Kurihara .............................. 428/174 |

*Primary Examiner*—Carl D. Friedman
*Assistant Examiner*—W. Glenn Edwards
*Attorney, Agent, or Firm*—Daniel M. Stock

[57] ABSTRACT

An automobile roof headliner includes a relatively stiff molded backing sheet and a relatively deformable foam panel adhesively secured to the undersurface of the backing sheet. Marginal edge areas of the foam panel in contact with hard side rails on the roof are provided with resilent deformable foam inserts that prevent the hard side rails from interfering with the energy-absorption action of the foam panel.

8 Claims, 2 Drawing Sheets derer et al, shows a
AUTOMOBILE ROOF HEADLINER

FIELD OF THE INVENTION

This invention relates to an interior roof headliner for an automobile, and particularly to a headliner comprised of plastic foam material.

DESCRIPTION OF THE RELATED PRIOR ACT

U.S. Pat. No. 4,119,749 to J. Roth et al discloses a molded panel that apparently can be used as a roof headliner in an automobile. The panel is comprised of a corrugated cardboard backing sheet faced with a relatively soft foam sheet having approximately the same thickness as the backing sheet. Downwardly curved edge areas of the backing sheet are crushed and at the same time reinforced with polymerized polyurethane foam impregnated into the sheet corrugations.

U.S. Pat. No. 4,131,702, to F. Alfter et al, discloses a molded headliner that comprises a corrugated cardboard core completely encapsulated within two polyethylene foam panels, whereby the cardboard is shielded against moisture that could adversely affect the strength of the cardboard core.

U.S. Pat. No. 5,089,328 to R. Doerer et al, shows a headliner comprised of multiple foam layers laminated with a heat-activated adhesive. A hardening compound is impregnated through one of the foam layers into the other foam layer to provide a gradual transition in hardness through the foam layers.

SUMMARY OF THE INVENTION

The present invention is concerned with a headliner assembly comprised of a relatively rigid backing sheet and a relatively soft foam panel laminated to said sheet. Edge areas of the backing sheet are turned downwardly for attachment to the roof side rails. The foam density of the headliner is locally increased at the roof rail areas for absorbing impact energy directed toward the relatively hard roof rails from within the automobile interior.

An aim of the invention is to provide an impact energy-absorbing headliner that can be economically produced as a unitary one piece construction. The headliner structure has a relatively small vertical thickness to achieve a marginally increased headroom dimension in the passenger space. Edge areas of the headliner have relatively stiff foam inserts molded between the foam panel and a stiff backing sheet, for thus absorbing impact energy direct toward the relatively hard side rails that are used to mount the headliner. In extended application of the invention, local areas of the foam panel can be backed with relatively stiff foam inserts to meet special mounting requirements for coat hooks, grab handles, visor attachments, etc.

BRIEF DESCRIPTION OF THE DRAWINGS

Referring to FIG. 1 there is shown an automobile roof 10 having a molded headliner 12 of the present invention installed therein. The roof includes internal rails 14 that provide strength along the side marginal areas of the automobile body, from the front windshield area to the back window area. Edge areas of headliner 12 are attached to roof rails 14.

Figure 2:
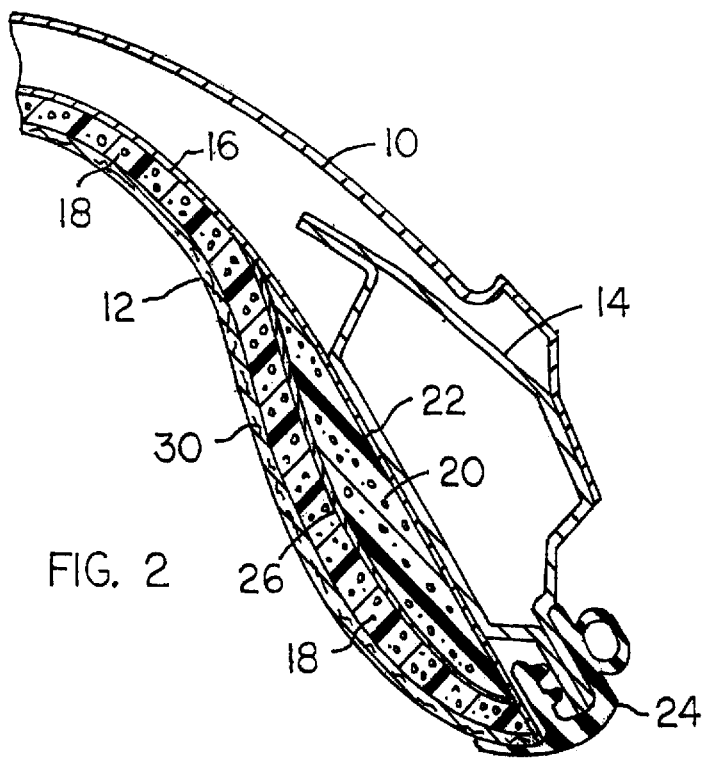
FIG. 2 is a fragmentary enlarged sectional view of the FIG. 1 headliner, showing structural features not apparent in FIG. 1.

Headliner 12 comprises a relatively stiff semi-flexible backing panel 16 spanning the roof rails 14 in close proximity to roof 10, and a foam panel 18 adhesively attached to the undersurface of the backing panel. At the side marginal areas of the headliner, longitudinal foam strips 20 are interposed between the foam panel and backing panel 16. The foam strips act as deformable spacers between foam panel 18 and the relatively hard rails 14, whereby the engery-absorbing action of the foam panel is retained at the side rail areas.

Figure 1:
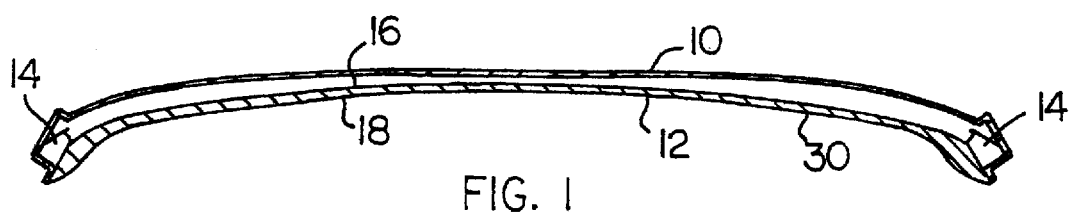
FIG. 1 is a transverse sectional view taken through a molded headliner embodying the invention.

FIG. 2 shows some features of the molded headliner not apparent from FIG. 1. As shown in FIG. 2, the illustrative side rail 14 has a box cross-section for strength and rigidity. The headliner seats against a flat surface 22 of the side rail; an elastomeric edge molding 24 is attached to side rail 14 so as to overlie the raw edge of the headliner.

As shown in FIG. 2, the foam spacer strip 20 is secured to foam panel 18 via an adhesive film 26 extending the entire length of the foam strip (normal to the plane of the paper). The adhesive film can be a thin sheet of fusible material, e.g. polyethylene, that becomes tacky when heated during a molding operation. Adhesive film 26 can be supplemented with a fiberglass sheet (not shown); i.e. a tacky fiberglass sheet can occupy the space occupied by adhesive film 26. Alternately, the adhesive film can be a sprayed adhesive material.

Foam panel 18 can be a relatively soft urethane cellular foam material having a relatively constant thickness.

Each spacer strip 20 is preferably a molded foam material having approximately the same density as foam panel 18. During a molding operation, to be described, strip 20 can be somewhat densified so as to eventually have a somewhat denser cell structure than foam panel 18, whereby each spacer strip 20 has a higher deformation resistance than the foam panel. The densification of each strip 20 can be achieved by impregnating each strip with an isocyanate hardening compound that penetrates and weakens the foam cell walls; during a molding (heating) operation the hardening compound polymerizes to stiffen the cell walls, thereby somewhat increasing the deformation resistance of the foam strip. The molding operation also reconfigures each foam strip to the desired configuration depicted in FIG. 2.

Backing panel 16 is a molded panel that is relatively stiff and rigid so as to act as an essentially stationary backstop for foam panel 18 and foam strips 20. Panel 16 can be a fiberglass panel molded in a separate operation prior to assembling foam panel 18 and foam strips 20 onto the backing panel. However, for reasons of manufacturing economy, backing panel 16 is preferably molded to its final configuration as part of the process used to mold spacer strips 20 and attach foam panel 18 to the backing panel.

Figure 5:
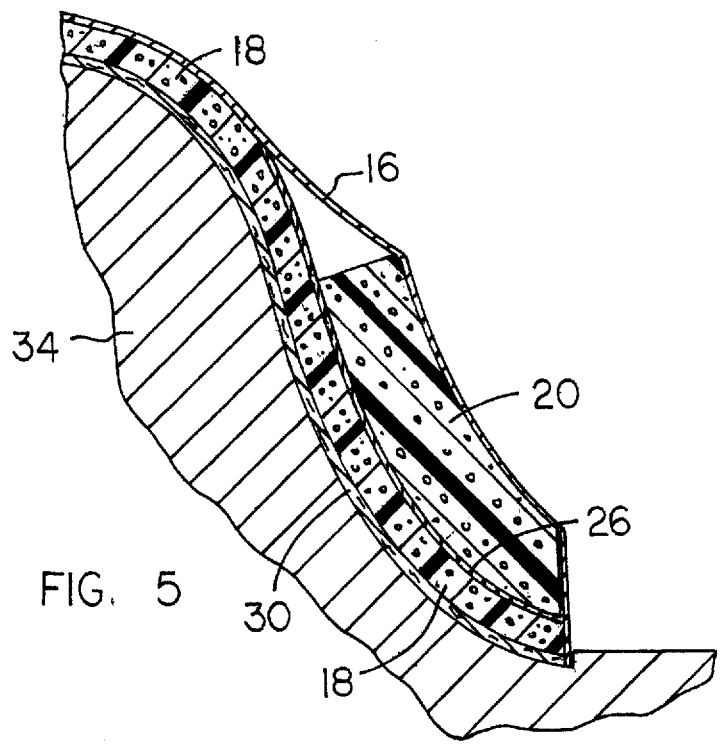
FIG. 5 is a fragmentary sectional view showing the FIG. 4 assembly after placement in a mold.

Prior to the molding operation, panel 16 can be a flexible woven fiberglass panel (fabric) or fiberglass rovings pressed together into a flexible gauge-like sheet. The fiberglass sheet can be draped over the foam panel 18 and foam strip 20, 20 as shown in FIG. 5., to position the sheet in the mold cavity. During the molding (heating) operation the fiberglass filaments are fused and reconfigured to give the backing panel the desired shape and rigidity.

The exterior surface of foam panel 18 is covered with a decorative flexible cover sheet 30, that can be a thin foam sheet faced with a woven cloth coating on its lower surface. Cover sheet 30 can have a thickness of about one eighth inch.

Figure 3:
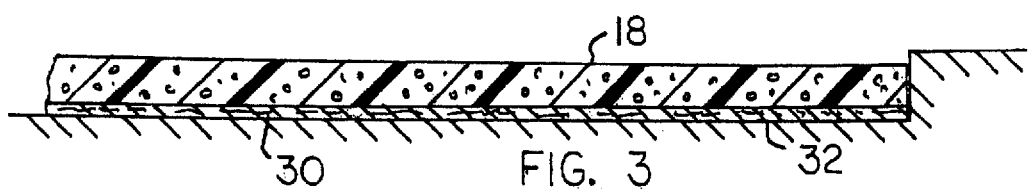
FIG. 3 fragmentarily shows a foam panel and cover sheet used in the FIG. 2 assembly, but prior to the molding operation.

FIGS. 3 through 6 illustrate a sequence of steps that may be used to form a molded headliner of the present invention. As shown in FIG. 3, the cover sheet 30 is positioned on a flat sub-surface 32, after which a contact adhesive is sprayed onto the exposed surface of the sheet. Foam panel 18 is then adhesively attached to the flat cover sheet.

Figure 4:
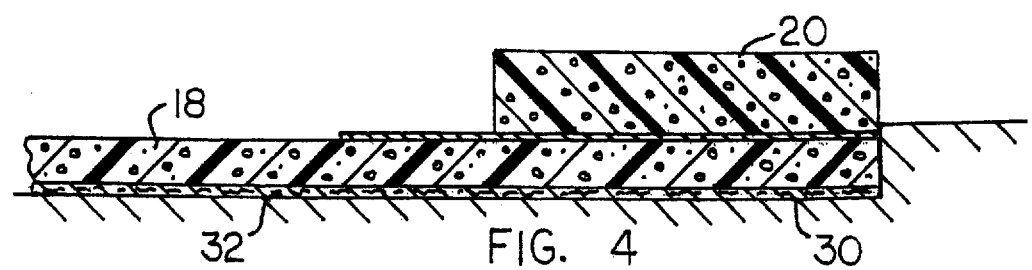
FIG. 4 is a view taken in the same direction as FIG. 3, but showing a foam insert (or strip) placed on the foam panel.

Referring to FIG. 4, an adhesive film 26 is placed on the foam panel, after which a rectangular foam strip 20 is placed on the adhesive film. Rectangular foam strip 20 can be impregnated with a liquid hardening compound, e.g. toluence di-isocyanate, prior to placement on adhesive film 26. It will be appreciated that FIGS. 3 through 6 are fragmenting views showing edge areas of the headliner assembly. The structures depicted in FIGS. 3 through 6 are duplicated at the opposite side edge area of the headliner.

Figure 6:
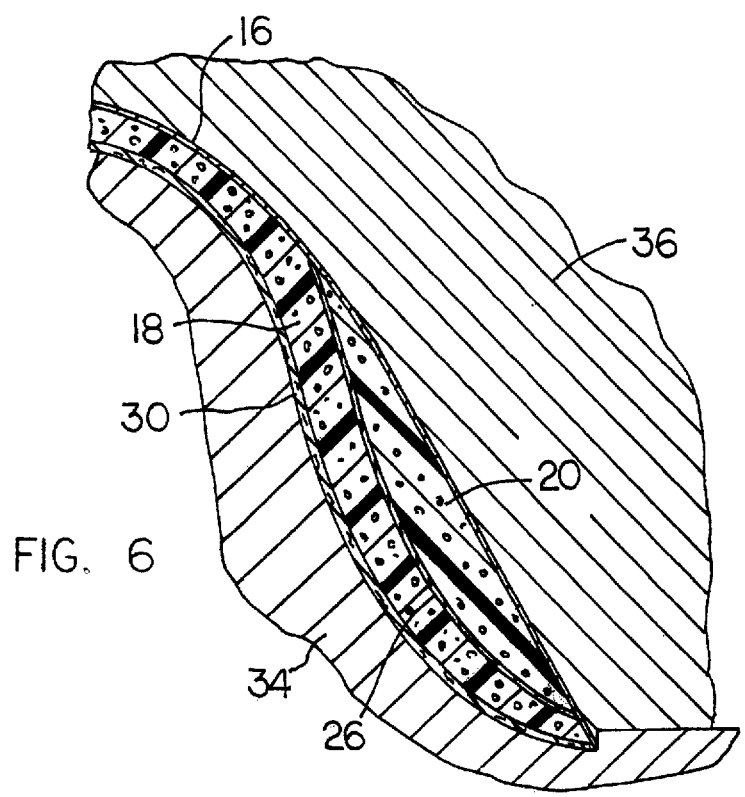
FIG. 6 shows FIG. 4 assembly after completion of a molding operation.

FIGS. 5 and 6 show the headliner components after placement in a mold cavity. The mold cavity is defined by a lower mold member 34 having an upper surface that defines the shape of the headliner undersurface (depicted in FIG. 1), and an upper mold member 36 that defines the upper surface of the headliner. Referring to FIG. 5, after the assembly of FIG. 4 has been placed on mold cavity member 34, the flexible fiberglass sheet 16 is draped over the foam panel 18 and associated foam spacer strips 20.

FIG. 6 depicts the condition achieved after the upper mold member 36 has been closed, and after the mold apparatus has been cycled through a heating-cooling cycle, sufficient to mold sheet 16 and foam strips 20 to the FIG. 6 configuration.

The molding operation rigidities backing panel 16, and also somewhat stiffens the cell walls in spacer strips 20. By comparing FIGS. 5 and 6, it will be seen that the molding operation densifies the cellular structure of spacer strips 20, such that strips 20, 20 have greater deformation resistance than foam panel 18. Foam panel 18 is adhesively attached to spacer strips 20 and backing panel 16 by the molding operation, although the cellular structure and stiffness of the foam panel 16 is essentially unaffected by the molding operation.

As can be seen from FIGS. 2 and 6, the undersurfaces of foam strips 20 have convex arcuate surface cross-sectional configurations. The foam panel 18 follows the convex surface configurations of foam strips 20. The intervening adhesive film 26 acts as a barrier to flow of hardening compound from strips 20 to foam panel 18, whereby the resilience of foam panel 18 is unaffected by the presence of foam strips 20. Foam strips 20 act as resilient spacers between foam panel 18 and backing panel 16. The cushioning (energy absorption) action of foam panel 18 is retained across the entire span of the foam panel, including the side rails 14.

What is claimed:

1. An automobile roof headliner adapted to span two spaced apart rails at marginal areas of the automobile roof, comprising:

a backing panel having an upper surface, a lower surface and two side edges adapted to extend along the roof rails;

two impact energy absorbing foam spacer strips extending along the lower surface of said backing panel proximate to the panel side edges; and an impact energy-absorbing foam panel covering the lower surface of said backiing panel and said spacer strips;

said foam strips having a higher deformation resistance than the foam panel, whereby the deformation resistance of the headliner is greater along the marginal areas of the automibile roof than in the area between said marginal areas.

2. The headliner of claim 1, wherein said backing panel is fiberglass.

3. The headliner of claim 1, wherein said foam panel has two side edges coextensive with the side edges of said backing panel; said foam panel having a substantially constant thickness between its side edges.

4. The headliner of claim 1, wherein each foam spacer strip has a flat upper surface seating against the backing panel and a convex arcuate lower surface adhesively secured to the foam panel.

5. The headliner of claim 4, and further comprising an adhesive film interposed between the convex arcuate surface of each foam strip and the foam panel.

6. An automobile roof headliner adapted to span two spaced apart rails at marginal areas of the automobile roof, comprising:

a backing panel having an upper surface and a lower surface; said backing panel having marginal rail-seat areas extending downwardly at acute angles;

two impact energy-absorbing foam spacer strips extending along the side marginal areas of said backing panel on the lower surface; said foam spacer strips having convex arcuate lower surfaces; and an impact energy-absorbing foam panel covering the entire lower surface of said backing panel and said spacer strips;

said foam strips having a higher deformation resistance than the foam panel, whereby the deformation resistance of the headliner is greater along the marginal areas of the automibile roof than in the area between said marginal areas.

7. The headliner of claim 6 and further comprising an adhesive film interposed between the convex arcuate surface of each foam strip and the foam panel.

8. The headliner of claim 6, wherein each said foam strip has a hardening compound therein that causes said foam strips to have a higher deformation resistance than the foam panel; and an adhesive barrier film interposed between the convex arcuate surface of each foam strip and the foam panel for preventing the migration of hardening compound from the foam strips into the foam panel.

* * * * *